United States Patent [19]
Hillestad et al.

[11] Patent Number: 4,889,454
[45] Date of Patent: Dec. 26, 1989

[54] PORTABLE POWER TOOL FOR MILLING TUBE ENDS

[76] Inventors: Tollief O. Hillestad, 108 9th Ave., West, Summerland Key, Fla. 33042; Mark W. Hillestad, 220 Hatch Rd., Wadsworth, Ohio 44281

[21] Appl. No.: 254,958

[22] Filed: Oct. 7, 1988

[51] Int. Cl.$^4$ ............................................. B23B 47/08
[52] U.S. Cl. ..................................... 408/124; 408/201; 408/211; 408/702; 409/175
[58] Field of Search ................ 408/124, 201, 211, 702, 408/125; 409/138, 175

[56] References Cited

U.S. PATENT DOCUMENTS

| | | | |
|---|---|---|---|
| 3,228,268 | 1/1966 | Strout | 409/175 X |
| 3,817,649 | 6/1974 | Medney | 408/211 |
| 4,620,823 | 11/1986 | Hillestad | 409/178 |
| 4,761,104 | 8/1988 | Hillestad | 409/175 |

FOREIGN PATENT DOCUMENTS 434676  9/1935  United Kingdom ................ 408/124

Primary Examiner—Steven C. Bishop
Attorney, Agent, or Firm—Daniel J. Hudak Co.

[57] ABSTRACT

A portable gas operated rotary tool is provided for milling a surface on the end of a cylindrical workpiece. The tool has a motor powered by a pressurized gas, such as compressed air. The motor directly drives a rotary milling head which is axially aligned with the axis of rotation of the motor. The motor has a stator chamber which houses a rotor having radial slots. Vanes are journaled within said slots for radial movement within the slot and define progressively expanding cavities. The milling head has a central bore for mounting on an arbor of the motor. The milling head includes blades for milling a frustonconical surface on the workpiece and means to align the tool with the longitudinal axis of the workpiece.

19 Claims, 2 Drawing Sheets

PORTABLE POWER TOOL FOR MILLING TUBE ENDS

FIELD OF THE INVENTION

The present invention relates to portable power tools for milling an end surface on tubular cylindrical workpieces, such as pipes, tubes, etc. More particularly, the invention relates to air pressure-operated cutting tools with a rotary milling head adapted to mill a frustoconical bevel on the end of pipe to provide, for example, a suitable surface for welding the ends of two such tubes or pipes together in axial alignment.

BACKGROUND

Heretofore, it has frequently been necessary to repair various types of pipe and tube by cutting a section of the pipe out of the line and inserting a new section. Normally, the new section would be welded to the cut ends of the adjacent pipe lengths. In accordance with preferred welding practice, a groove should be provided at the point of weld to permit the molten metal to weld to a relatively large surface area of the pipes. In order to do this, the adjoining ends of the pipe lengths to be welded should be provided with a frustoconical bevel so that when the two ends are placed in alignment, a circumferential groove is formed to receive the molten metal from the welding rod.

Accordingly, the preferred practice is to mill a frustoconical bevel on the respective ends of the pipe lengths.

In many instances, such as in replacing sections of corroded pipe in a boiler, it is necessary to mill the cut end of a pipe which cannot be removed from it installed position. Accordingly, it is desirable to have a portable milling tool which the operator can carry to the desired location and accurately position in alignment with the pipe. Also, it is desirable that the tool be an air pressure-operated type tool, since many working environments might have volatile gases that could be ignited by electric arcing from an electrical power tool.

The prior art devices used for milling operations of this type have utilized an air pressure-operated motor arranged with it the axis of rotation at right angles to the axis of rotation of the milling cutter. Power is transferred from the air motor to the milling cutter through bevel gears, such as is shown in prior art U.S. Pat. Nos. 4,620,823 and 4,761,104. The bevel gear system shown in those patents provides a substantial gear reduction so that the milling head rotates no faster than at a speed of around 100 RPM. These slow speeds require an axial guide pin that is inserted and secured in the end of the tube or pipe to stabilize the milling head during the cutting operation.

More importantly, these prior art devices with the bevel gear arrangement cause great stresses on the gear teeth and, as a result, the teeth are often damaged after only a short period of operation, requiring rebuilding of the tool.

The tool of the present invention resolves the difficulties indicated above, and affords other features and advantages heretofore not obtainable.

SUMMARY OF THE INVENTION

An aspect of the present invention is to eliminate the need for reduction gears in air-operated, portable milling tools which are utilized to mill beveled surfaces on the ends of tubes, pipes, and the like. The construction is generally compact and less complex than heretofore constructions. Moreover, the time required to mill the beveled surface is drastically reduced.

The tool of the present invention is specifically adapted to mill or grind a frustoconical beveled surface on the end of a tubular, cylindrical workpiece (i.e., pipe or tube end) having a longitudinal axis. The tool has a housing that defines a central axis and that contains a rotary air motor mounted in its rearward end, the motor having a shaft that rotates about the central axis. A fitting is provided for supplying air under pressure through the housing to the rotary motor. Located at the forward end of the housing is a tool coupler assembly or collet that includes a spindle journaled therein and connected at its rearward end to the rotary shaft of the air motor. Located on the arbor of the spindle is a rotary milling head attachable to the coupler for rotation about the central axis. The milling head has a central guide pin extending forwardly thereof and adapted to be inserted with close tolerances in the open end of the tube or pipe to be milled and to position the cutting head in proper axial alignment with the tube or pipe during the milling operation.

The housing is also provided with handles or other holding means so that the tool may be positioned by an operator with the central axis of the tool in alignment with the longitudinal axis of the workpiece, whereby rotation of the milling head mills a frustoconical beveled surface on the workpiece.

DETAILED DESCRIPTION OF THE INVENTION

Figure 1:
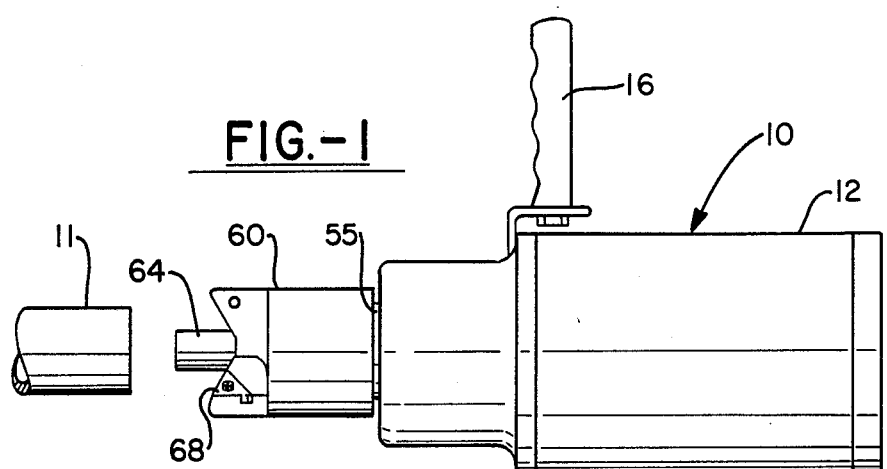
FIG. 1 is a side elevation of a rotary air-operated milling tool embodying the invention.
Figure 3:
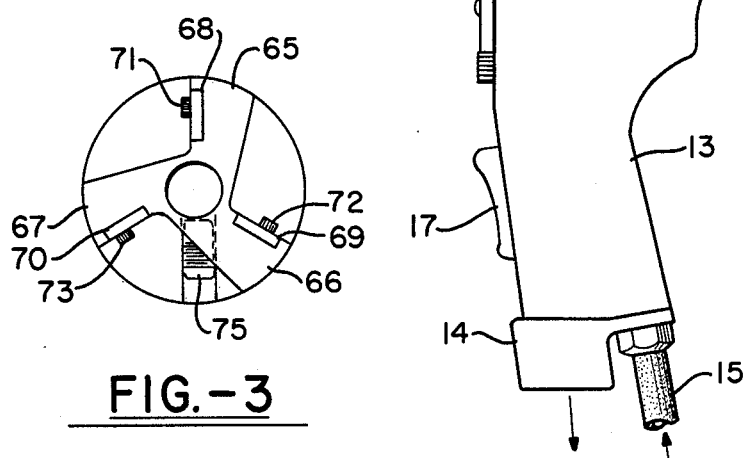
FIG. 3 is a front end elevation showing the milling head of FIG. 2.

Referring more particularly to the drawings, and initially to FIG. 1, there is shown a portable rotary cutting tool 10 for milling a frustoconical end surface on an open end of tubular, cylindrical workpieces 11 such as pipes, tubes, etc. The tool includes as its principal components a cylindrical housing 12, an air motor assembly 20, a spindle assembly 50, and a milling head 60.

The cylindrical housing 12 has a pistol grip handle 13 attached thereto with a hose fitting 14 at its outer end and adapted to receive a pressure hose 15 which is pressured by a gas, such as compressed air. Extending from the opposite side of the housing is a stabilizer handle 16. An operator of the tool holds the tool with both hands and actuates the motor by means of a switch on the handle 13 which actuates a solenoid valve which controls the pressure line from an air compressor. The operator places the tool 10 with the milling cutter 60 in axial alignment with the tube or pipe 11 and, while holding the tool correctly in position, actuates the air motor to initiate the milling operation and to cut a beveled surface on the end of the pipe 11.

Figure 4:
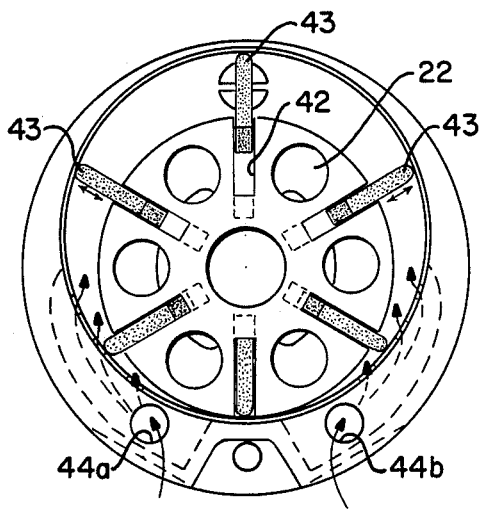
FIG. 4 is a transverse, sectional view of the air motor used to drive the rotary milling tool of the invention taken on the line 4—4 of FIG. 2.
Figure 5:
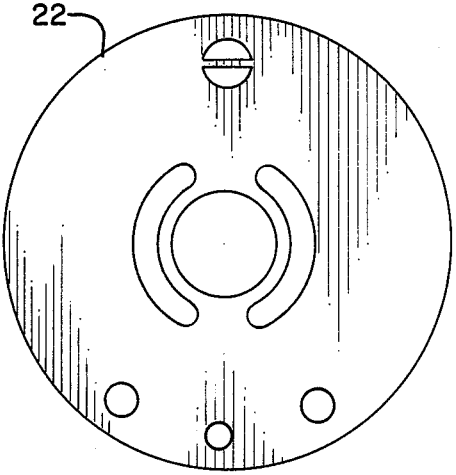
FIG. 5 is a transverse, sectional view of the air motor taken on the line 5—5 of FIG. 2.

The air motor assembly 20 includes a stator with a front plate 22, a rear plate 23, and a cylindrical stator ring 24 (FIG. 4). The front plate 22, rear plate 23 and stator ring 24 are all provided with a brass liner to define the eccentric stator chamber 25. The various components of the stator are held in proper alignment by a locator pin 27. A forward bearing assembly 28 is located adjacent the outer surface of the front plate 22 and another bearing assembly 29 is formed integrally with the rear plate 23. The bearings 28 and 29 serve to journal the rotor shaft 30 at its opposite ends.

The rotor shaft 30 has its forward end that is journaled in the bearing assembly 28, provided with a forwardly extending splined section 32. The rearward end of the rotor shaft is journaled in the bearing assembly 29. A rotor 35 is located within the stator chamber 25. The chamber 25 has a circular cross-section but is eccentric with respect to the axis of rotation of the rotor 35, which coincides with the axis of the rotor shaft 30.

Rotor 35 is desirably light weight and made from a lightweight material such as aluminum, e.g., as from aluminum bar stock. Moreover, stator chamber 25 can also be made from aluminum. The rotor and optionally the stator is hardened and desirably has a Rockwell A hardness of at least 50, and preferably at least 58.

The rotor 35 is provided with six symmetrically spaced radial slots 42, each of which receives a radial vane 43 having a convex inner surface. The floor of each slot 42 has a curved shape that coincides with the convex inner surface of a vane 43. When the motor is engaged, the vanes are forced outward so that the outer surface bears against the inner surface of the chamber 25. The vanes 45 divide the chamber 25 into asymmetrical lobes.

The vanes 43 slide in radial directions between a retracted position in the slot where the straight distal surface of the vane bears against the surface of the stator chamber at the shortest radial distance. As the rotor turns in a clockwise direction, the radial vanes 43 move radially outward to maintain engagement with the surface of the lobed chamber 25 until they reach the maximum extension illustrated at the upper portion of the lobe as shown in FIG. 4. Accordingly, the radial vanes 43, the outer surface 41 of the rotor 35, and inner surface of the stator chamber define progressively expanding cavities, i.e. the lobes. The resulting expansion of the compressed air produces continuous rotation of the rotor.

Compressed air enters the lobed stator chamber 25 at an inlet 44a or 44b, respectively, formed at the bottom of the stator ring 24 and exits through an exit port 45 formed in the front plate at the top of the chamber. The air enters through 44a for a clockwise rotation of the rotor and through 44b for counter clockwise rotation.

The air motor thus described is adapted to turn at speeds of between 4500 and 5000 RPM.

Figure 2:
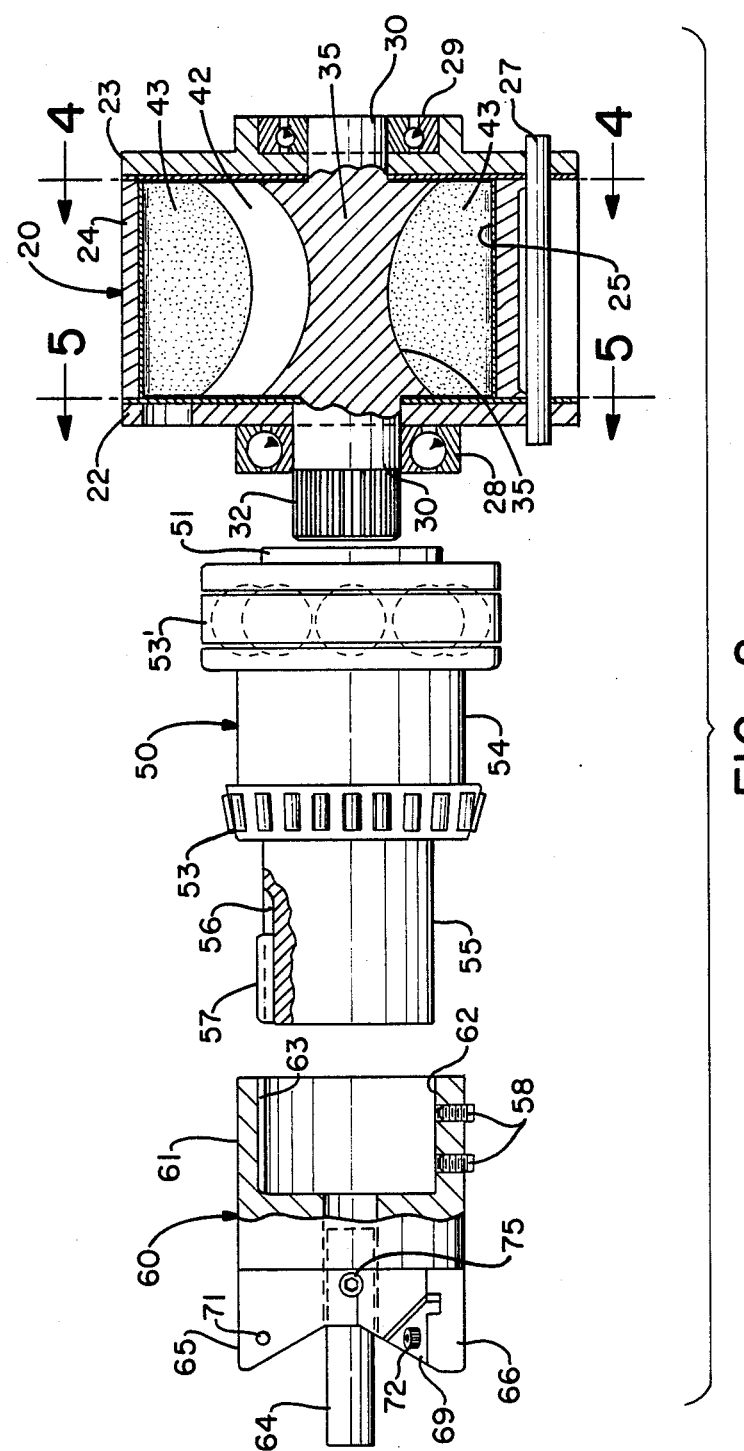
FIG. 2 is a partial exploded, elevational view showing the cutting tool, and with parts broken away and shown in section for the purpose of illustration.

FIG. 2 shows the spindle assembly 50 which includes a spindle shaft 51 with a recess formed at its inner end and having internal splines. The internal splines mesh with the splined end 32 of the rotor shaft 30 to couple the spindle assembly to the motor.

The assembly includes bearing units 53 and 53' which are mounted in a spindle housing 54 and in which the spindle is journaled. The forward end of the spindle has an arbor 55 with a longitudinal slot 56 that receives a key 57.

The milling cutter 60 is removably secured to the arbor and may be quickly removed so that different sized milling cutters for different size pipe, etc. may be easily mounted and replaced on the arbor. The cutter has cylindrical body 61 with a bore 62 formed in its rearward end. The bore has a longitudinal slot 63 that cooperates with the key 57 seated in the slot 56 to lock the cutter to the arbor. The cutter 60 is also retained against axial movement on the arbor 55 by set screws 58 located in threaded radial bores in the body of the cutter.

Located in an axial bore in the forward end of the body 61 is a guide pin 64 which is adapted to be inserted in the open end of the pipe 11 to help position the milling cutter correctly during the milling operation. The guide pin is secured in the body 61 by a set screw 75 located in threaded radial bores in the body.

Also formed in the forward end of the milling cutter are three symmetrically arranged, axially extending radial blade supports 65, 66, and 67 that extend in a forward direction. Each of the blade supports 65, 66, and 67 has a cutting blade 68, 69, and 70 secured thereto with set screws 71, 72, and 73. Accordingly, the cutting blades 68, 69, and 70 may be replaced on the end of the milling cutter when they become worn.

Operation

The operation of the tool thus described will be considered as beginning at a point when an appropriate milling cutter 60 has been mounted on the arbor 55 and the pressure hose 15 has been connected to the tool. The operator holding the tool by one hand on the pistol grip 13 and with the other hand in the stabilizer handle 16 lifts the tool and aligns it with the open end of the pipe 11 to be milled. The guide pin 64 is inserted in the open end of the pipe 11 to help support the tool 10 in axial alignment. Then the operator presses the switch 17 to actuate the air motor 20 to begin the high-speed turning of the spindle assembly 50. A typical rotary speed for the tool is from about 2,500 RPM to about 6,000 RPM and preferably from about 4500 to about 5000 RPM. While the guide pin 64 must rotate within the open end of the pipe, sufficient clearance is provided that there is a minimum friction resisting rotation of the pin 64.

With the tool in this condition, the operator moves the milling cutter 60 forward until the blades 68, 69, and 70 engage and begin to cut or mill a beveled surface in the open end of the pipe 11. Because of the high speed of the tool that results from a unique arrangement of the air motor 20, spindle assembly 50, and milling cutter 60, a frustoconical surface may be milled within five seconds. This represents a substantial improvement over prior art devices, which generally required about one minute to place the same beveled surface on the end of a pipe. Once the beveled surface has been milled, the operator retracts the guide pin 64 from the end of the pipe and deactivates the air motor.

While in accordance with the Patent Statutes, the best mode and preferred embodiment has been set forth, the scope of the invention is not limited thereto, but rather by the scope of the attached claims.

What is claimed is:

1. A portable, gas-operated rotary tool for milling a surface on an end of a tubular workpiece having a longitudinal axis, comprising:
   a rotary gas-operated motor having a central axis of rotation defined by a motor output shaft, said output shaft being splined to a spindle assembly;
   means for supplying gas under pressure to said rotary motor;

a rotary milling head being keyed to said spindle assembly so as to be operatively connected to said rotary motor in axial alignment therewith and being directly driven thereby about said central axis, said milling head able to turn at a speed of at least 2500 rpm;

guide means connected to and extending forwardly from said milling head for relative insertion in said tubular workpiece; and means for gripping said tool whereby an operator may position said milling head with said central axis in alignment with said longitudinal axis of said workpiece so that rotation of said milling head mills a surface on the respective end of said tubular workpiece.

2. A portable tool as defined in claim 1, wherein said tool further comprises a housing and a tool coupler journaled in said housing for rotation about said central axis and connected to said rotary motor.

3. A portable tool as defined in claim 2, wherein said rotary milling bead is adapted to be interchangeably connected to said tool coupler.

4. A portable tool as defined in claim 1, wherein said guide means comprises a cylindrical pin coaxial with said central axis.

5. A portable tool as defined in claim 1, wherein said milling head is adapted to mill a frustoconical surface on said workpiece.

6. A portable tool defined in claim 5, wherein said frustoconical surface defines a forwardly and inwardly extending annular bevel, and wherein said milling head is able to turn at a speed of from about 2,500 rpm to about 6,000 rpm.

7. A portable gas-operated rotary tool for milling a surface of an end of a tubular cylindrical workpiece having a longitudinal axis, comprising:

a housing defining a central axis and having a forward end and a rearward end;

a rotary gas-operated motor having an output shaft defining an axis of rotation mounted in the rearward end of said housing with said axis of rotation coincident with said central axis and operating at a rotational speed during use;

means for supplying gas under pressure to said rotary motor;

a tool coupler located at the forward end of said housing and directly connected to the output shaft of said rotary motor;

a rotary milling head attachable directly to said coupler for rotation about said central axis, the rotational speed during use of said milling head being the same as said motor;

guide means connected to and extending forwardly from said milling head for selective insertion in said open end of said tubular cylindrical workpiece; and handle means mounted on said housing whereby said tool may be positioned by an operator with said central axis in alignment with said longitudinal axis of said workpiece so that rotation of said milling head mills a surface on the respective end of said tubular workpiece.

8. A portable rotary tool for milling a surface or an end of a cylindrical workpiece having a longitudinal axis comprising:

a gas pressure driven rotary motor having an output shaft defining an axis of rotation;

an interchangeable milling head having a central axis of rotation which is axially aligned with the axis of rotation of the motor;

transmission means directly connecting said milling head and said output shaft whereby the rotation of said output shaft directly causes the rotation of said milling head about the central axis at a rotary speed of up to about 6000 RPM;

means for gripping said tool whereby an operator may position said milling head with said central axis in alignment with said longitudinal axis of said workpiece so that rotation of said milling head mills a surface on the respective end of the workpiece.

9. A portable rotary tool as defined in claim 8, further including guide means for alignment of the central axis and the longitudinal axis.

10. A portable rotary tool as defined in claim 9 wherein said motor comprises a stator chamber and a rotor, and said rotor has a surface of rotation formed about the axis of rotation of said motor, and said stator chamber is eccentric with respect to said axis of rotation.

11. A portable rotary tool as defined in claim 10, wherein said rotor includes a plurality of symmetrically spaced radial slots, each of said slots receiving a radial vane whereby said vanes are disposed for radial movement in said slots.

12. A portable rotary tool as defined in claim 11 wherein said rotary motor includes an arbor aligned along said central axis and said rotary milling head defines a cylindrical central bore aligned along said central axis and said transmission comprises said arbor which is adapted to be disposed within said bore, and means to lock said arbor against relative movement in said bore.

13. A portable rotary tool as defined in claim 12, wherein said surface is a frustoconical surface.

14. A portable rotary tool as defined in claim 8, wherein said rotary motor is made from a light weight material.

15. A portable rotary tool as defined in claim 9, wherein said rotary motor is made from a light weight material.

16. A portable rotary tool as defined in claim 11, wherein said rotary motor is made from aluminum.

17. A portable rotary tool as defined in claim 12, wherein said rotor includes a plurality of symmetrically spaced radial slots, each of said slots receiving a radial vane whereby said vanes are disposed for radial movement in said slots, and wherein said rotor has a Rockwell A hardness of at least 50.

18. A portable rotary tool as defined in claim 9, wherein said milling head rotates at a speed of up to about 5,000 RPM.

19. A portable rotary tool as defined in claim 12, wherein said milling head rotates at a speed of from about 4,500 to about 5,000 RPM.

* * * * *